United States Patent
Kaufmann et al.

(10) Patent No.: US 8,926,233 B2
(45) Date of Patent: Jan. 6, 2015

(54) TOOLHOLDER AND CUTTING INSERT THEREFOR

(71) Applicant: Kennametal Inc., Latrobe, PA (US)

(72) Inventors: Igor Kaufmann, Nürnberg (DE); Scott Etling, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 199 days.

(21) Appl. No.: 13/742,673

(22) Filed: Jan. 16, 2013

(65) Prior Publication Data

US 2014/0199129 A1 Jul. 17, 2014

(51) Int. Cl.
*B23B 29/14* (2006.01)
*B23B 27/16* (2006.01)
*B23B 29/04* (2006.01)
*B23B 27/04* (2006.01)

(52) U.S. Cl.
CPC .............. *B23B 27/1603* (2013.01); *B23B 27/04* (2013.01); *B23B 29/043* (2013.01)
USPC .......................................... 407/110; 407/108

(58) Field of Classification Search
CPC ...... B23B 27/04; B23B 27/045; B23B 27/16; B23B 2205/02; B23B 2260/132; B23B 29/043
USPC ................... 407/107, 108, 109, 110
See application file for complete search history.

(56) References Cited

U.S. PATENT DOCUMENTS

| | | | | |
|---|---|---|---|---|
| 5,076,739 | A | * | 12/1991 | Pano .............................. 407/116 |
| 5,139,371 | A | | 8/1992 | Kraft et al. |
| 6,244,790 | B1 | * | 6/2001 | Kingdom et al. ............. 407/110 |
| 6,799,925 | B2 | * | 10/2004 | Ejderklint ..................... 407/116 |
| 7,121,771 | B2 | | 10/2006 | Englund |
| 7,300,232 | B2 | | 11/2007 | Wiman et al. |
| 7,488,142 | B2 | | 2/2009 | Englund et al. |
| 7,578,639 | B2 | | 8/2009 | Wiman et al. |
| 7,887,267 | B2 | | 2/2011 | Niemi et al. |
| 8,104,999 | B2 | * | 1/2012 | Hecht ........................... 407/110 |

\* cited by examiner

*Primary Examiner* — Will Fridie, Jr.
(74) *Attorney, Agent, or Firm* — Larry R. Meenan, Esq.

(57) ABSTRACT

A cutting tool (10) includes a toolholder (12) and a cutting insert (14) removably securable in the toolholder. The cutting insert (14) includes a lower clamping surface (18) with a V-shaped clamping surface (32, 34) on each side of a central portion (28). The toolholder includes a lower clamping surface (56) with an inverted V-shaped clamping surface (62, 64) on each side of the bottom surface (60) formed by a primary clamping surface (62a, 64a) and a secondary clamping surface (62b, 64b). The secondary clamping surfaces (32b, 34b) of the cutting insert (14) contacts the secondary clamping surfaces (62b, 64b) of the toolholder (12) when the cutting tool (10) is brought into a clamped position due to interference between the toolholder (12) and the cutting insert (14), thereby providing a minimum of four clamping surfaces when in the clamped position.

15 Claims, 7 Drawing Sheets

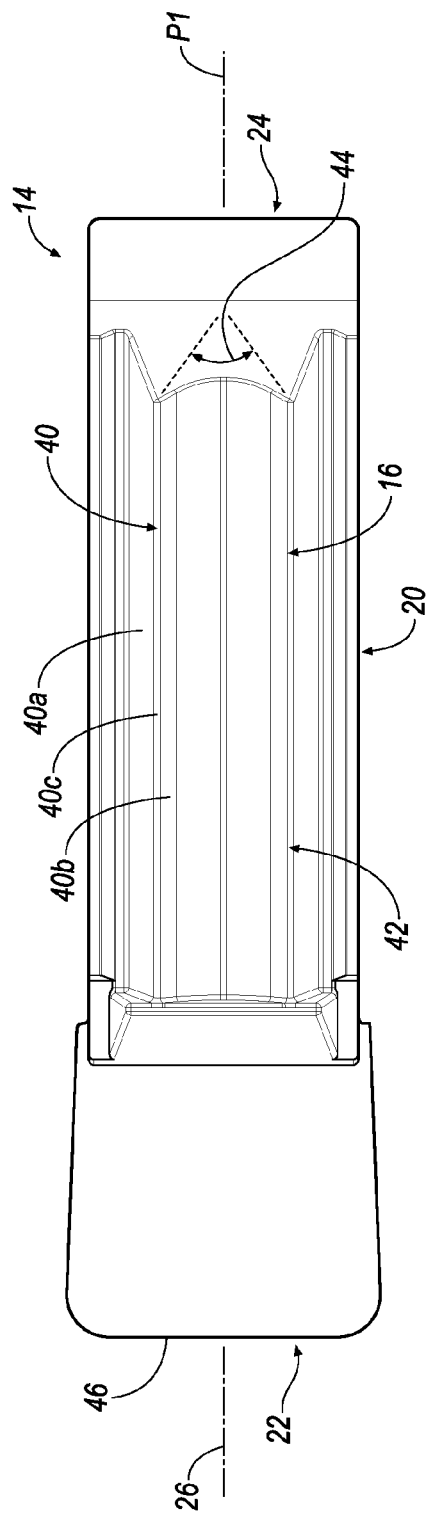
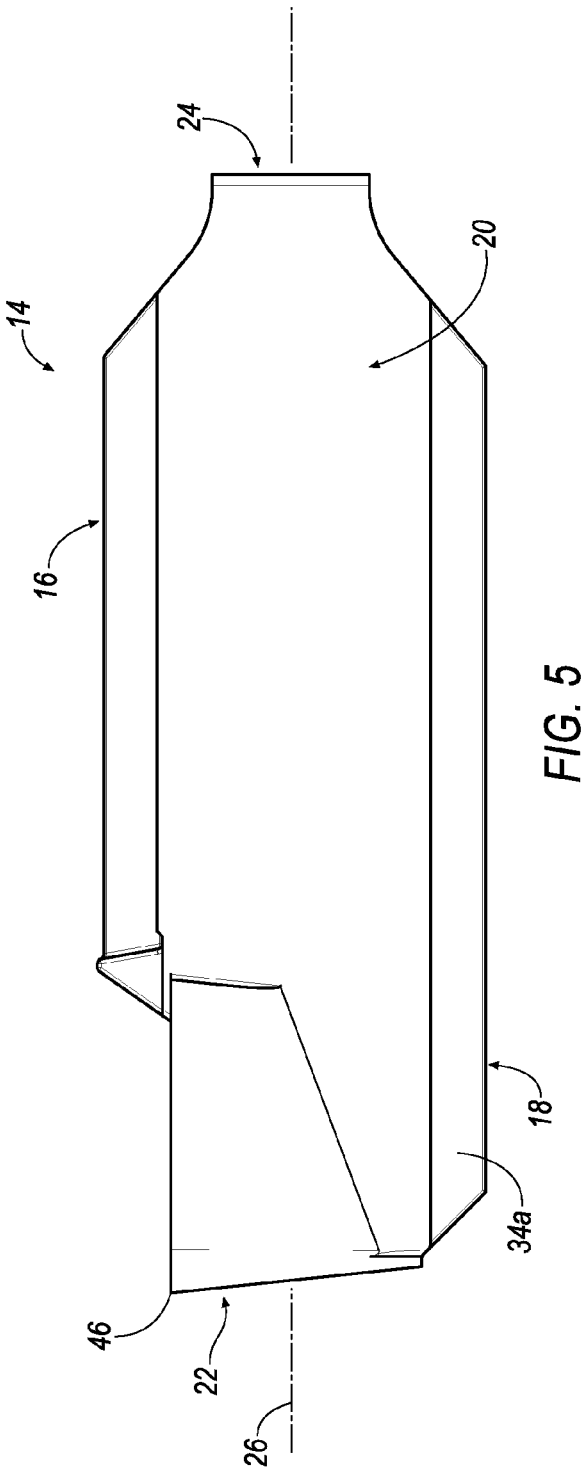
FIG. 4
FIG. 5

TOOLHOLDER AND CUTTING INSERT THEREFOR

BACKGROUND OF THE INVENTION

The invention relates in general to a cutting tool and a cutting insert for use in metal cutting operations, and in particular to a cutting tool and a cutting insert for grooving and turning operations.

U.S. Pat. No. 6,086,291 discloses a cutting tool for parting, grooving, and turning operations where each clamping surface includes a second V-shaped feature. A ridge style feature of narrower wedge angle is introduced along the length of the male V-shaped surface of the insert holder, and a flute style feature of narrower wedge angle is introduced along the length of the female V-shaped surface of the insert.

The insert and insert holder are manufactured such that when assembled, a small gap exists between the ridge and flute side surfaces. Thus, during operation, the wider obtuse angled V-shaped surfaces generally support the central main forces, and the narrower angled ridge and flute V-shaped surfaces generally support the transverse forces. The presence of a small gap between the ridge and flute side surfaces may give rise to an initial transverse movement of the insert of magnitude equal to the gap size at commencement of a turning operation.

U.S. Pat. No. 6,244,790 discloses a cutting tool for parting, grooving, and turning operations, introducing lower support surfaces with a series of intermeshing ridges and grooves of V-shaped profile, each with a common narrow wedge angle. This solution is aimed at providing increased stability of the insert within the insert holder against twisting, while, in theory, also reducing the risk of the insert lower surface splitting by providing a larger surface area for the clamping force to be distributed.

Distribution of the clamping force over a large surface area requires successful mating of, and simultaneous contact between, the several ridge surfaces extending the entire longitudinal direction of the cutting insert, and the equal number of grooves extending along the entire longitudinal direction of the cutting insert pocket.

U.S. Pat. No. 8,104,999 discloses a grooving cutting insert having a convex or concave V-prism or tooth style bottom with point contacts (in cross section). One disadvantage of this cutting insert design is that the V-prism on the bottom of the cutting insert does not provide adequate support against side load and movement in the vertical direction.

SUMMARY OF THE INVENTION

The problem of providing adequate support for the cutting insert in the cutting tool against side load and movement in the vertical direction is solved by providing a toolholder and cutting insert with at least four (4) clamping surfaces; two primary contact surfaces formed between a small angle prism on the cutting insert and the pocket, and two secondary clamping surfaces formed between the quasi-flat chamfer on the pocket with a chamfer on the cutting insert.

In one aspect, a cutting tool comprises a toolholder and a cutting insert removably securable in the toolholder; the cutting insert comprising upper and lower clamping surfaces, peripheral side surfaces extending between the upper and lower clamping surfaces and front and rear end surfaces extending between the peripheral side surfaces with a longitudinal axis passing therebetween, the lower clamping surface of the cutting insert including a central portion with a V-shaped clamping surface on each side of the central portion, each V-shaped clamping surface formed by a primary clamping surface, a secondary clamping surface and a vertex therebetween. The toolholder comprises a head portion with an insert-receiving slot opening out to a forward end of the toolholder, the head portion including an upper clamping surface and a lower clamping surface, the lower clamping surface including a central portion with a substantially planar bottom surface and an inverted V-shaped clamping surface on each side of the bottom surface, each inverted V-shaped clamping surface formed by a primary clamping surface, a secondary clamping surface and a vertex therebetween, wherein the primary clamping surfaces of the cutting insert contacts the primary clamping surfaces of the toolholder and a gap exists between the secondary clamping surfaces of the cutting insert and the secondary clamping surfaces of the toolholder due to a difference in width between the V-shaped clamping surfaces of the cutting insert and the inverted V-shaped clamping surfaces of the toolholder when the cutting tool is in the unclamped position, and wherein the secondary clamping surfaces of the cutting insert contacts the secondary clamping surfaces of the toolholder when the cutting tool is brought into a clamped position due to interference between the toolholder and the cutting insert, thereby providing a minimum of four contact surfaces when in the clamped position.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 shows a top view of the cutting insert of FIG. 3;

FIG. 5 shows a side view of the cutting insert of FIG. 3;

DETAILED DESCRIPTION OF THE INVENTION

Figure 1:
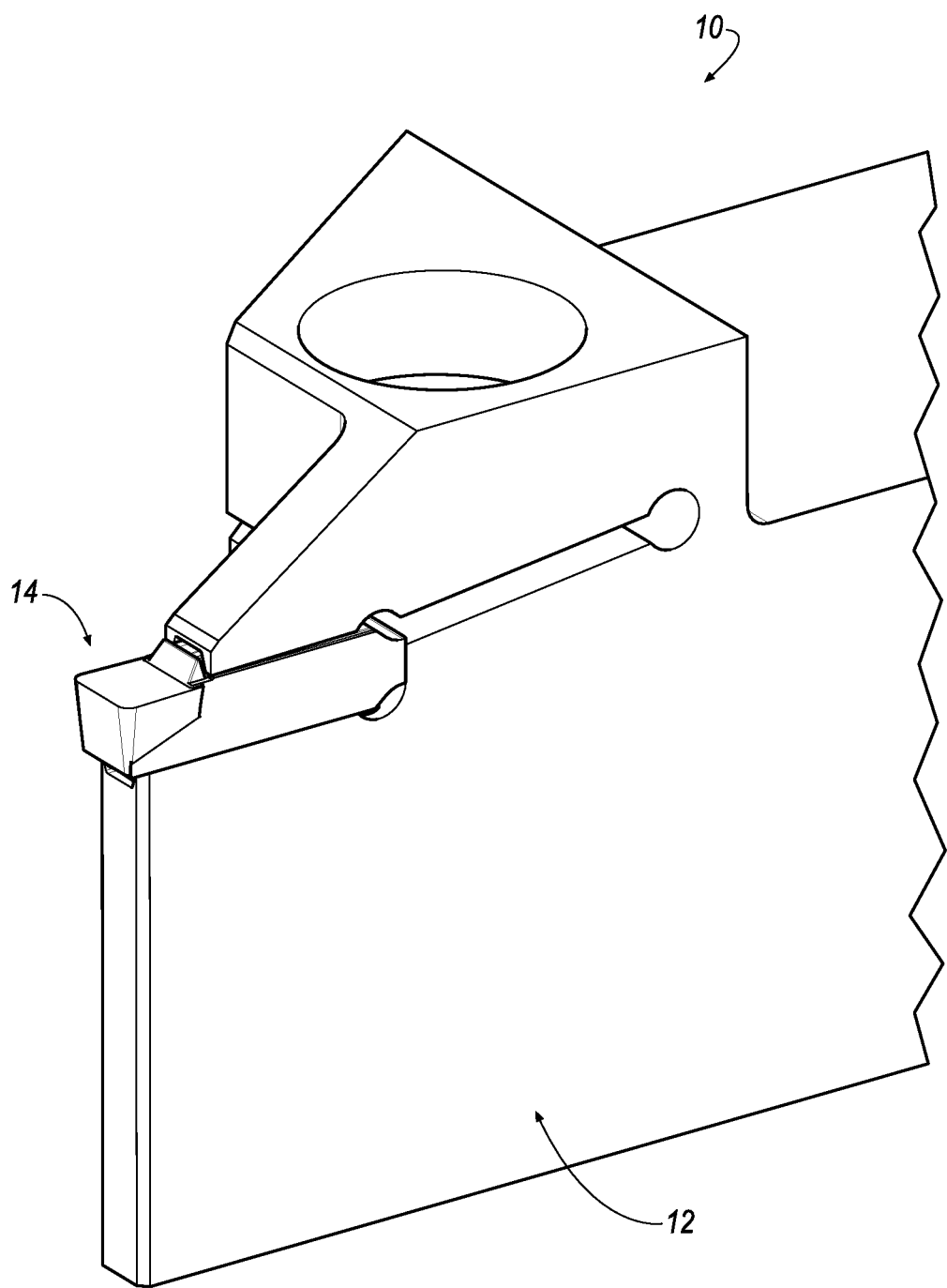
FIG. 1 shows a partial perspective view of a cutting tool comprising a toolholder and a cutting insert according to an embodiment of the invention.
Figure 2:
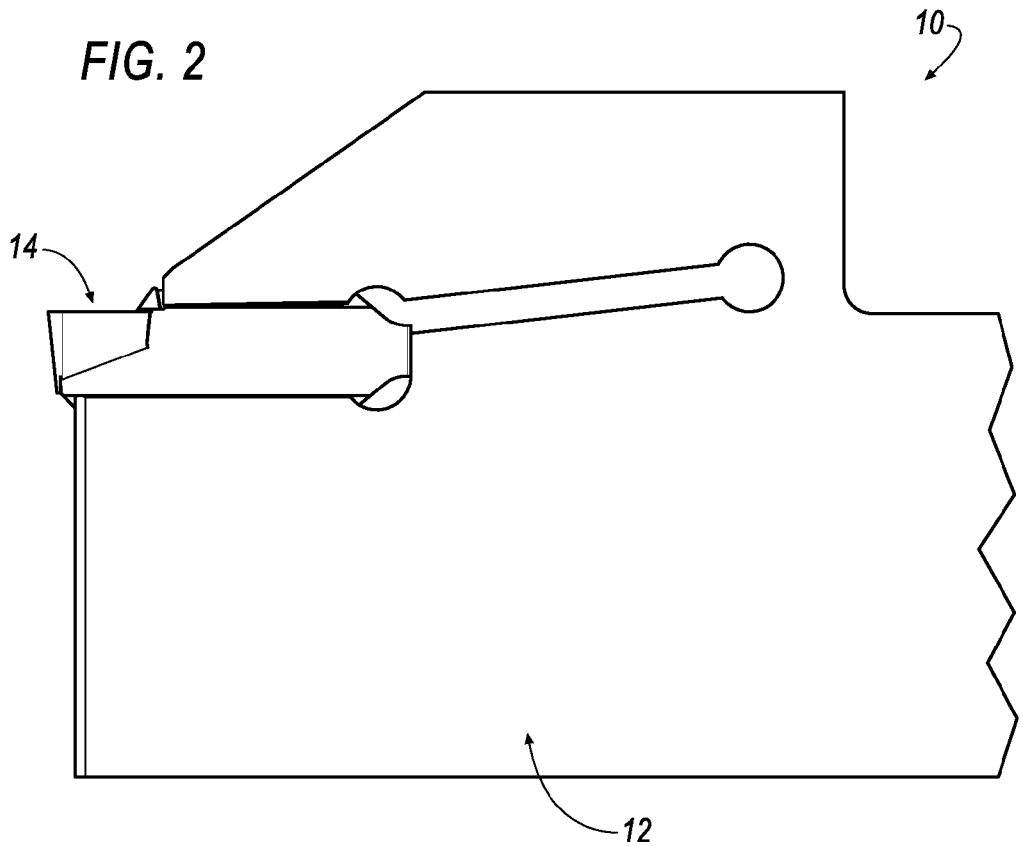
FIG. 2 shows a partial side view of the cutting tool of FIG. 1.
Figure 3:
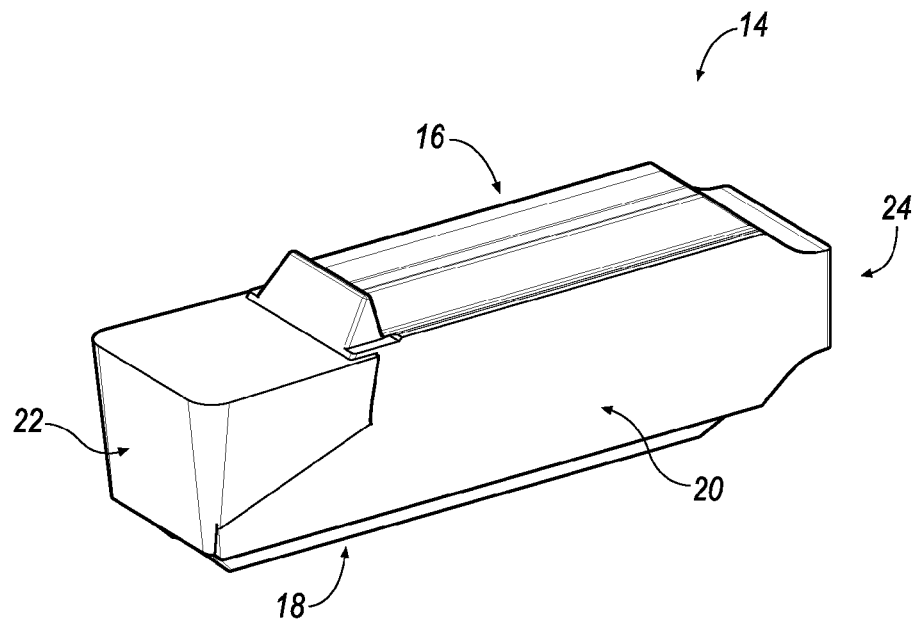
FIG. 3 shows a perspective view of the cutting insert according to an embodiment of the invention.

Referring now to FIGS. 1 and 2, a cutting tool 10 includes a toolholder 12 and a cutting insert 14 mounted thereto. The toolholder 12 is generally manufactured from steel, and the cutting insert 14 is generally manufactured by form pressing and sintering a cemented carbide, such as tungsten carbide, and can be coated or uncoated.

Referring now to FIGS. 3-7, the cutting insert 14 includes upper and lower clamping surfaces 16, 18 and peripheral side surfaces 20 extending between the upper and lower clamping surfaces 16, 18. The cutting insert 14 also includes front and rear end surfaces 22, 24 extending between the peripheral side surfaces 20 with a longitudinal axis 26 passing therebetween.

Figure 6:
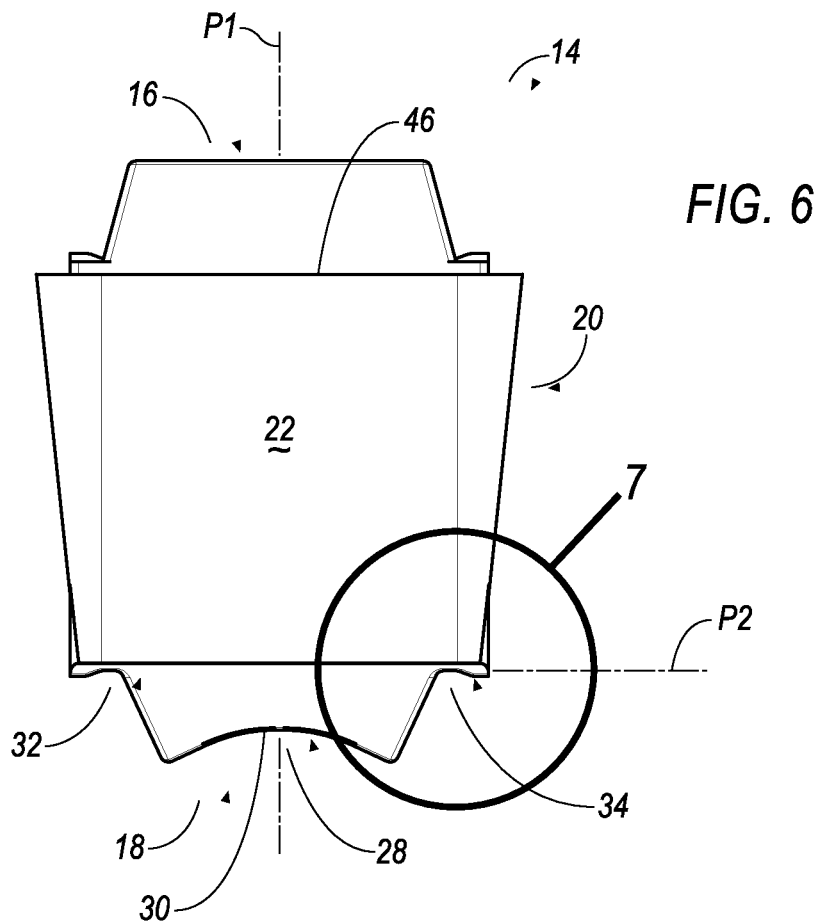
FIG. 6 shows an end view of the cutting insert of FIG. 3.

One aspect of the invention is that the lower clamping surface 18 of the cutting insert 14 includes a central portion 28 with a concave-shaped recess 30 and a V-shaped clamping surface 32, 34 on each side of the concave-shaped recess 30. The recess 30 being concave-shaped provides for a material savings when manufacturing the cutting insert 14. However, the recess 30 does not contact the insert pocket and can be any desirable shape, such as planar, and the like. According to the first embodiment, the cutting insert 14 may have mirror symmetry about a major plane P1, passing through the upper and lower clamping surfaces 16, 18 and the longitudinal axis 26, as shown in FIG. 6. Although not shown in the illustrated embodiment, it is envisioned that the principles of the invention can be applied to a cutting insert that is also mirror symmetry about a minor plane that is perpendicular to P1. As a result of being mirror symmetric about the major plane P1, the V-shaped clamping surfaces 32, 34 are substantially identical to each other, and therefore only the clamping surface 34 will be discussed and shown for brevity.

Figure 7:
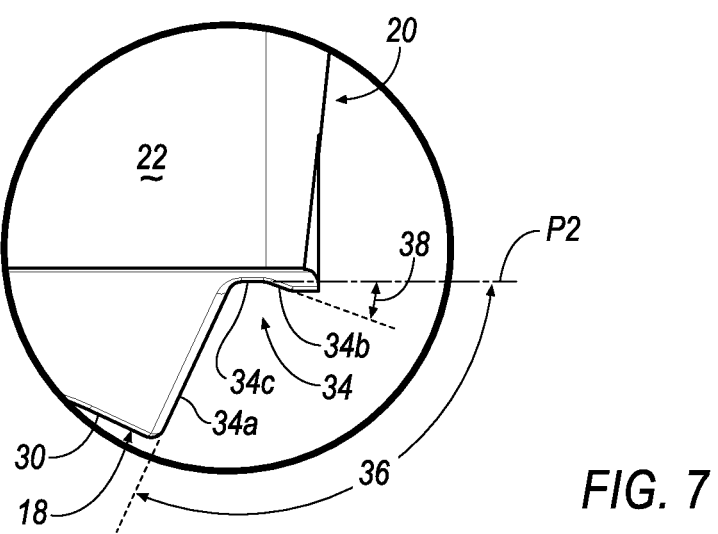
FIG. 7 shows an enlarged view of the clamping surfaces of the cutting insert of FIG. 3.

As shown in FIG. 7, the V-shaped clamping surface 34 is formed by a primary clamping surface 34a, a secondary clamping surface 34b and a vertex 34c therebetween. In the illustrated embodiment, the primary and secondary clamping surfaces 34a, 34b are substantially planar. The primary clamping surface 34a is formed at a relatively large angle 36 with respect to a minor plane P2 perpendicular to the primary plane P1, whereas the secondary clamping surface 34b is formed at a relatively small angle 38 with respect to the minor plane P2. In one embodiment, the angle 36 is in a range between about 110 degrees to about 150 degrees, and the angle 38 is in a range between about 0 degrees and about 30 degrees. In other words, the angle 38 formed by the secondary clamping surface 34b is smaller than the angle 36 formed by the primary clamping surface 34a. As described below, the primary clamping surface 34a defines a primary contact area with the pocket, whereas the secondary clamping surface 34b defines a secondary contact area with the pocket for a minimum of four (4) contact areas on the cutting insert 14.

The upper clamping surface 16 of the cutting insert 14 includes two V-shaped insert clamping surfaces 40, 42. As a result of being mirror symmetric about the major plane P1, the V-shaped clamping surfaces 40, 42 are substantially identical to each other, and therefore only the clamping surface 40 will be described for brevity. The V-shaped clamping surface 40 is formed by a pair of clamping surfaces 40a, 40b and a vertex 40c therebetween. In the illustrated embodiment, the clamping surfaces 40a, 40b are substantially planar. As shown in FIG. 4, the clamping surfaces 40a, 42a form an internal wedge angle 44 with respect to each other. In one embodiment, the wedge angle 44 is in a range between about 40 degrees to about 120 degrees.

It should be appreciated that throughout the detailed description and claims, the surfaces of the V-shaped clamping surfaces 32, 34 are substantially planar, and use of the term; V-shaped clamping surface, is not restricted to a clamping surface with two planar clamping surfaces 34a, 34b forming a "V" shape and intersecting at a vertex 34c, but also accounts for a clamping surface 32, 34 with a curve or radius joining the two planar clamping surfaces, or a clamping surface 32, 34 with a secondary groove or ridge feature between the two planar clamping surfaces.

It should also be appreciated that throughout the detailed description and claims, an "internal angle" refers to an angle between two surface components of a member surface as measured internal to the member, whereas an "external angle" refers to an angle between two surface components of a member surface as measured external to the member.

The cutting insert 14 also includes a cutting edge 46 formed at the intersection between the upper surface 16 and the front surface 22. In the illustrated embodiment, the cutting insert 14 includes a single cutting edge 46. However, it will appreciated that, if the cutting insert 14 is mirror symmetric about the minor plane P2, then the cutting insert 14 would also have an additional cutting edge at the intersection between the upper surface 16 and the rear surface 24. This second cutting edge is optional and is not necessary to practice the principles of the invention.

Figure 8:
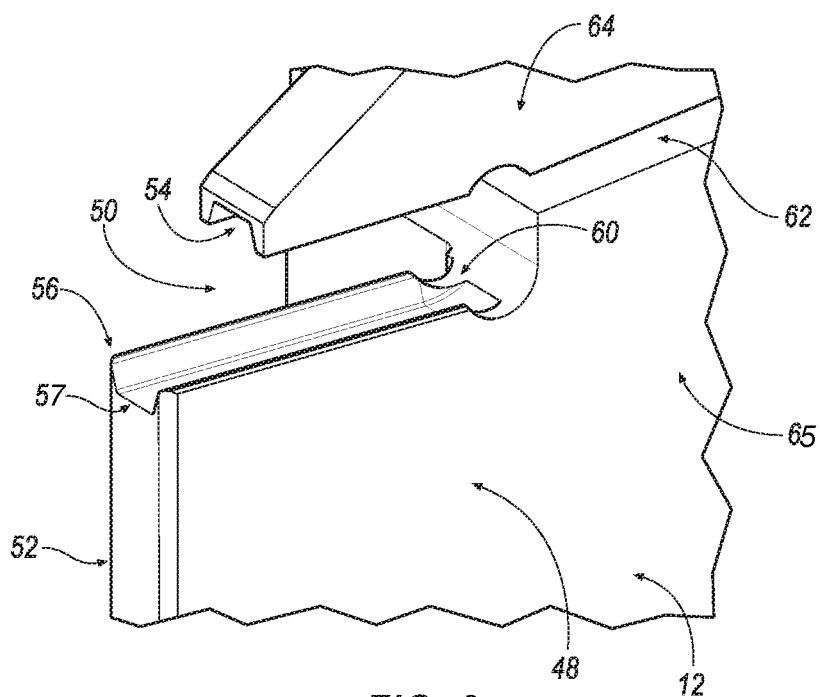
FIG. 8 shows a partial perspective view of the toolholder according to an embodiment of the invention.
Figure 9:
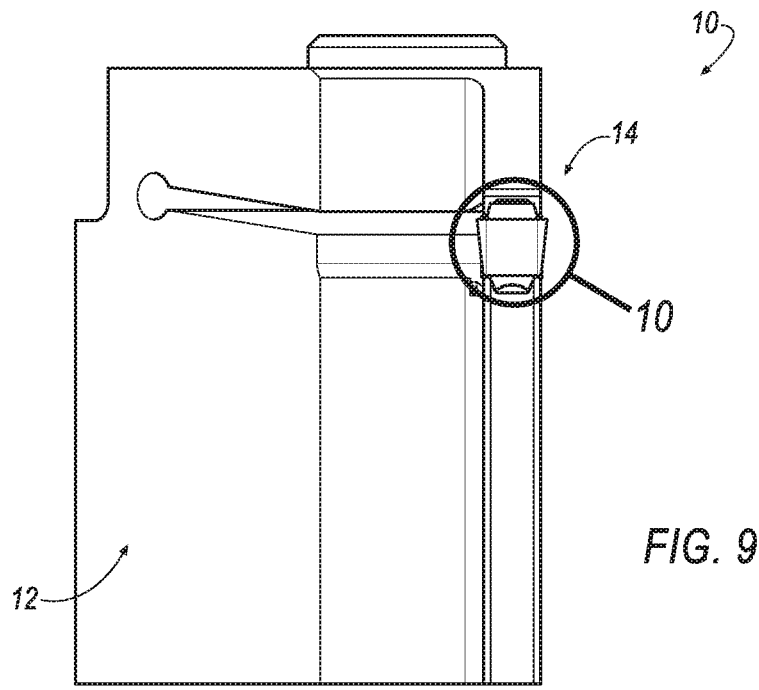
FIG. 9 is an end view of the toolholder of FIG. 8.
Figure 10:
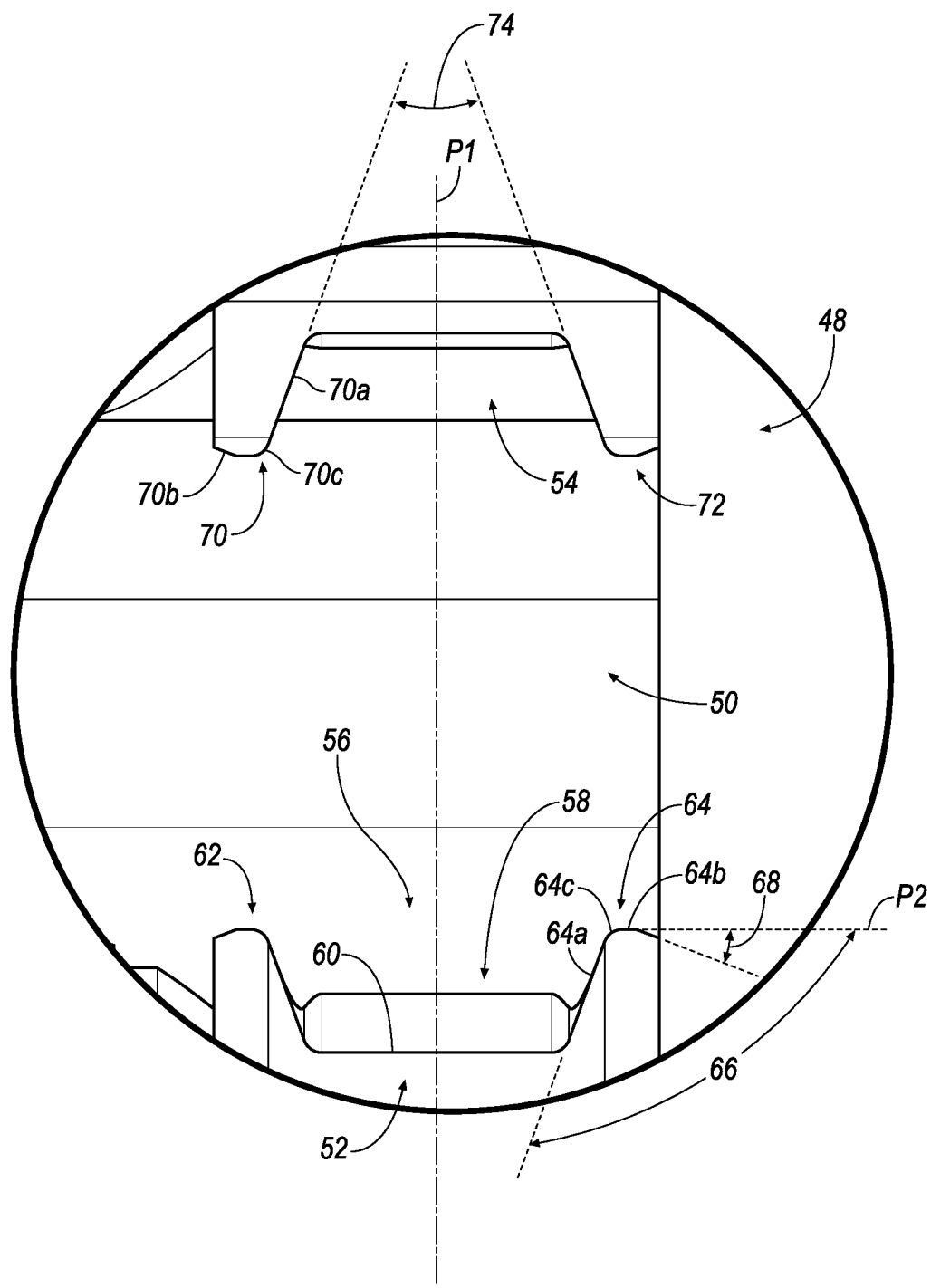
FIG. 10 is an enlarged view of the clamping surfaces of the toolholder of FIG. 8.

Referring now to FIGS. 8-10, the toolholder 12 includes a head portion 48 with an insert-receiving slot 50 opening out to a forward end 52 of the toolholder 12. The head portion 48 includes an upper clamping surface 54 and a lower clamping surface 56 sharing a common longitudinal direction from a front end 57 to a rear end 60 of the lower clamping surface 56. A narrow spring slot 62, which divides the head portion 48 into an upper clamping jaw 64 and a lower base jaw 65 extends rearwards from the insert-receiving slot 50.

One aspect of the invention is that the lower clamping surface 56 includes a central portion 58 with a substantially planar bottom surface 60 and inverted V-shaped clamping surfaces 62, 64 on each side of the bottom surface 60. In the illustrated embodiment, the clamping surface 56 is mirror symmetry about the major plane P1, and therefore only the clamping surface 64 will be discussed for brevity.

As shown in FIG. 10, the inverted V-shaped clamping surface 64 is formed by a primary clamping surface 64a, a secondary clamping surface 64b and a vertex 64c therebetween. In the illustrated embodiment, the primary and secondary clamping surfaces 64a, 64b are substantially planar. The primary clamping surface 64a is formed at a relatively large angle 66 with respect to a minor plane P2 perpendicular to the primary plane P1, whereas the secondary clamping surface 64b is formed at a relatively small angle 68 with respect to the minor plane P2. In general, the angles 66, 68 are substantially identical, but not necessarily equal to, the angles 36, 38 of the cutting insert 14. In one embodiment, the angle 66 is in a range between about 110 degrees to about 150 degrees, and the angle 68 is in a range between about 0 degrees and about 30 degrees. In other words, the angle 68 formed by the secondary clamping surface 64b is smaller than the angle 66 formed by the primary clamping surface 64a. As described below, the primary clamping surface 64a defines a primary contact area with the pocket, whereas the secondary clamping surface 64b defines a secondary contact area with the pocket for a minimum of four (4) contact areas on the toolholder 12. It should be noted that the angle 68 may be substantially identical, but not necessarily equal to, the angle 38 of the cutting insert 14. For example, the angle 66 can vary from the angle 36 of the cutting insert 14 by ±0.5 degrees. However, the angle 68 may be somewhat different than the angle 38 of the cutting insert 14. For example, the angle 68 can be equal to about 0 degrees, while the angle 38 can be equal to 10 degrees or more.

The upper clamping surface 54 of the toolholder 12 includes two inverted V-shaped insert clamping surfaces 70, 72. As a result of being mirror symmetric about the major plane P1, the V-shaped clamping surfaces 70, 72 are substantially identical to each other, and therefore only the clamping surface 70 will be described for brevity. The inverted V-shaped clamping surface 70 is formed by a pair of clamping surfaces 70a, 70b and a vertex 70c therebetween. In the illustrated embodiment, the clamping surfaces 70a, 70b are substantially planar. As shown in FIG. 10, the clamping surfaces 70a, 72a form an internal wedge angle 74 with respect to each other. In one embodiment, the wedge angle 74 between the clamping surfaces 70a, 72a of the toolholder 12 is approximately equal to the wedge angle 44 of the clamping surfaces 40a, 42a of the cutting insert 14. That is, the wedge angle 74 is in a range between about 40 degrees to about 120 degrees. However, it should be noted that the wedge angle 74 can be slightly different than the wedge angle 44. For example, the angle 74 can vary from the angle 44 of the cutting insert 14 by ±0.5 degrees.

It should be appreciated that throughout the detailed description and claims, the surfaces of the inverted V-shaped clamping surfaces 62, 64 are substantially planar, and use of the term; inverted V-shaped clamping surface, is not restricted to a clamping surface with two planar clamping surfaces 64a, 64b forming a "V" shape and intersecting at a vertex 64c, but also accounts for a clamping surface 62, 64 with a curve or radius joining the two planar clamping surfaces, or a clamping surface 62, 64 with a secondary groove or ridge feature between the two planar clamping surfaces.

Figure 11:
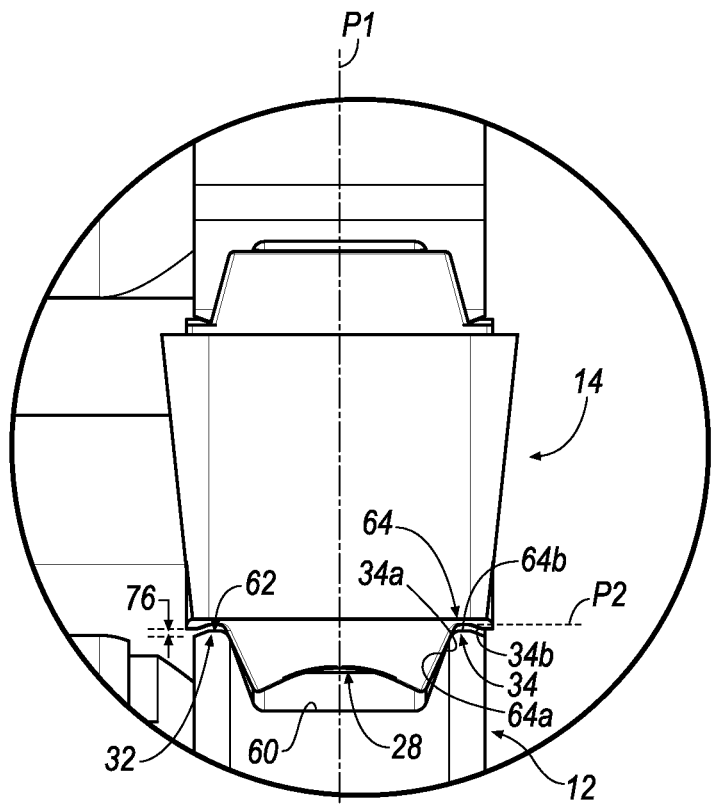
FIG. 11 is an enlarged view of the toolholder and the cutting insert when the cutting tool is in an unclamped position.
Figure 12:
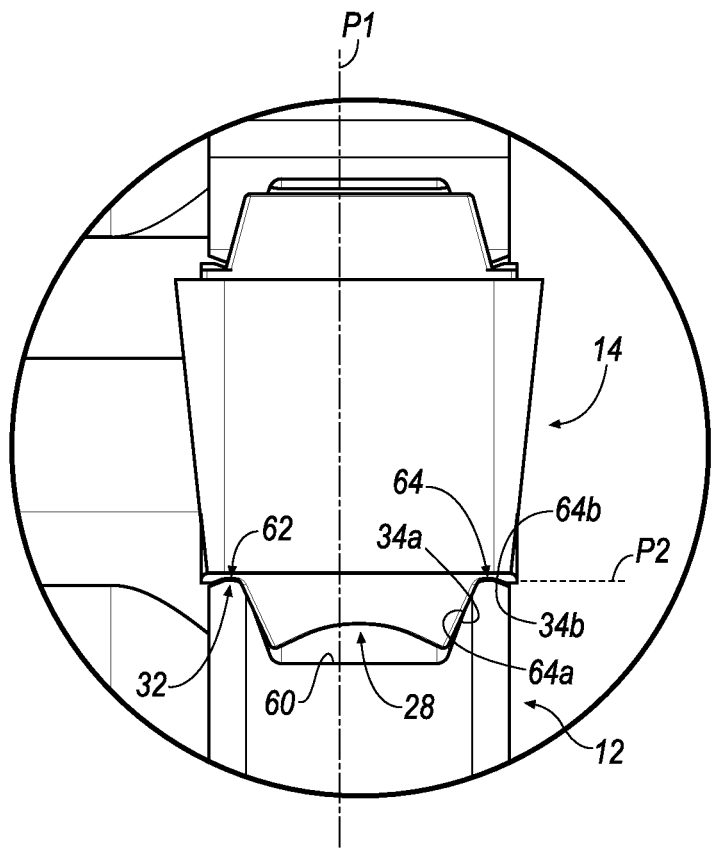
FIG. 12 is an enlarged view of the toolholder and the cutting insert when the cutting tool is in a clamped position.

The operation of the cutting tool 10 of the invention will now be described. FIG. 11 shows the cutting tool 10 in an unclamped position, while FIG. 12 shows the cutting tool 10 in a clamped position. Referring to FIG. 11, the primary clamping surfaces 32a, 34a of the cutting insert 14 contacts the primary clamping surfaces 62a, 64a of the toolholder 12 when the cutting tool 10 is in the unclamped position. However, a gap 76 exists between the secondary clamping surfaces 32b, 34b of the cutting insert 14 and the secondary clamping surfaces 62b, 64b of the toolholder 12 due to a very small difference in the width between the V-shaped clamping surfaces 32, 34 of the cutting insert 14 and the inverted V-shaped clamping surfaces 62, 64 of the toolholder 12.

When the cutting tool 10 is brought from the unclamped position to the clamped position shown in FIG. 12, the steel material of the toolholder 12 deforms radially outward due to the interference between the toolholder 12 and the cutting insert 14. This interference is caused by the very small difference in the width between the V-shaped clamping surfaces 32, 34 of the cutting insert 14 and the inverted V-shaped clamping surfaces 62, 64 of the toolholder 12.

As a result of this deformation of the toolholder 12 due to the interference between the toolholder 12 and the cutting insert 14, the secondary clamping surfaces 32b, 34b of the cutting insert 14 contact the secondary clamping surfaces 62b, 64b of the toolholder 12, resulting in a minimum of four (4) contact surfaces between the toolholder 12 and the cutting insert 14. Finite element analysis simulations have shown that providing a minimum of four (4) clamping surfaces provides adequate support for the cutting insert against side load and movement in the vertical direction, unlike a conventional toolholder having fewer contact areas.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A cutting tool (10), comprising:
a toolholder (12) and a cutting insert (14) removably securable in the toolholder; the cutting insert comprising:
upper and lower clamping surfaces (16, 18), peripheral side surfaces (20) extending between the upper and lower surfaces (16, 18) and front and rear end surfaces (22, 24) extending between the peripheral side surfaces (20) with a longitudinal axis (26) passing therebetween, the lower clamping surface (18) of the cutting insert including a central portion (28) and a V-shaped clamping surface (32, 34) on each side of the central portion (28), each V-shaped clamping surface (32, 34) formed by a primary clamping surface (32a, 34a), a secondary clamping surface (32b, 34b) and a vertex (32c, 34c) therebetween; the toolholder comprising:
a head portion (48) with an insert-receiving slot (50) opening out to a forward end (52) of the toolholder, the head portion (48) including an upper clamping surface (54) and a lower clamping surface (56), the lower clamping surface (56) including a central portion (58) with a substantially planar bottom surface (60) and an inverted V-shaped clamping surface (62, 64) on each side of the bottom surface (60), each inverted V-shaped clamping surface (62, 64) formed by a primary clamping surface (62a, 64a), a secondary clamping surface (62b, 64b) and a vertex (62c, 64c) therebetween,
wherein the primary clamping surfaces (32a, 34a) of the cutting insert (14) contacts the primary clamping surfaces (62a, 64a) of the toolholder (12) and a gap (76) exists between the secondary clamping surfaces (32b, 34b) of the cutting insert (14) and the secondary clamping surfaces (62b, 64b) of the toolholder (12) due to a difference in width between the V-shaped clamping surfaces (32, 34) of the cutting insert (14) and the inverted V-shaped clamping surfaces (62, 64) of the toolholder (12) when the cutting tool (10) is in the unclamped position, and
wherein the secondary clamping surfaces (32b, 34b) of the cutting insert (14) contacts the secondary clamping surfaces (62b, 64b) of the toolholder (12) when the cutting tool (10) is brought into a clamped position due to interference between the toolholder (12) and the cutting insert (14), thereby providing a minimum of four clamping surfaces when in the clamped position.

2. The cutting tool according to claim 1, wherein the cutting insert (14) is mirror symmetric about a major plane P1, passing through the upper and lower surfaces (16, 18) and the longitudinal axis (26).

3. The cutting tool according to claim 1, wherein the primary clamping surface (32a, 34a) of each V-shaped clamping surface (32, 34) of the cutting insert (14) is formed at a relatively large angle (36) with respect to a minor plane P2 perpendicular to the primary plane P1, and wherein the secondary clamping surface (32b, 34b) of each V-shaped clamping surface (32, 34) of the cutting insert (14) is formed at a relatively small angle (38) with respect to the minor plane P2.

4. The cutting tool according to claim 3, wherein the relatively large angle (36) is in a range between 110 degrees to 150 degrees.

5. The cutting tool according to claim 3, wherein the relatively small angle (38) is in a range between 0 degrees to 30 degrees.

6. The cutting tool according to claim 1, wherein the primary clamping surface (62a, 64a) of each inverted V-shaped clamping surface (64) of the toolholder (12) is formed at a relatively large angle (66) with respect to a minor plane P2 perpendicular to the primary plane P1, and wherein the secondary clamping surface (62b, 64b) of each inverted V-shaped clamping surface (64) of the toolholder (12) is formed at a relatively small angle (68) with respect to the minor plane P2.

7. The cutting tool according to claim 6, wherein the relatively large angle (66) is in a range between 110 degrees to 150 degrees.

8. The cutting tool according to claim 6, wherein the relatively small angle (68) is in a range between 0 degrees to 30 degrees.

9. The cutting tool according to claim 1, wherein the upper surface (16) of the cutting insert (14) includes two V-shaped insert clamping surfaces (40, 42).

10. The cutting tool according to claim 9, wherein the V-shaped clamping surfaces (40a, 42a) form an internal wedge angle (44) with respect to each other.

11. The cutting tool according to claim 10, wherein the internal wedge angle (44) is in a range between 40 degrees to 120 degrees.

12. The cutting tool according to claim 1, wherein the upper clamping surface (54) of the toolholder (12) includes two inverted V-shaped insert clamping surfaces (70, 72).

13. The cutting tool according to claim 12, wherein each inverted V-shaped clamping surface (70, 72) is formed by a pair of clamping surfaces (70a, 70b) and a vertex (70c) therebetween.

14. The cutting tool according to claim 13, wherein the clamping surfaces (70a, 72a) form an internal wedge angle (74) with respect to each other.

15. The cutting tool according to claim 14, wherein the internal wedge angle (74) is in a range between 40 degrees to 120 degrees.

* * * * *